US010387743B2

(12) United States Patent
Bronstein et al.

(10) Patent No.: US 10,387,743 B2

(45) Date of Patent: Aug. 20, 2019

(54) RECONSTRUCTION OF HIGH-QUALITY IMAGES FROM A BINARY SENSOR ARRAY

(71) Applicant: Ramot at Tel-Aviv University Ltd., Tel Aviv (IL)

(72) Inventors: Alex Bronstein, Haifa (IL); Or Litany, Tel Aviv (IL); Tal Remez, Tel Aviv (IL); Yoseff Shachar, Tel Aviv (IL)

(73) Assignee: Ramot at Tel-Aviv university Ltd., Tel Aviv (IL)

( * ) Notice: Subject to any disclaimer, the term of this patent is extended or adjusted under 35 U.S.C. 154(b) by 227 days.

(21) Appl. No.: 15/459,020

(22) Filed: Mar. 15, 2017

(65) Prior Publication Data

US 2017/0272639 A1 Sep. 21, 2017

Related U.S. Application Data

(60) Provisional application No. 62/308,898, filed on Mar. 16, 2016.

(51) Int. Cl.

| | |
|---|---|
| ***G06K 9/20*** | (2006.01) |
| ***G06T 5/00*** | (2006.01) |
| ***H04N 5/335*** | (2011.01) |

(52) U.S. Cl.

CPC .............. *G06K 9/209* (2013.01); *G06T 5/001* (2013.01); *H04N 5/335* (2013.01); *G06T 2207/20021* (2013.01); *G06T 2207/20076* (2013.01); *G06T 2207/20081* (2013.01); *G06T 2207/20084* (2013.01)

(58) Field of Classification Search

CPC ........ G06K 9/209; H04N 5/335; G06T 5/001; G06T 2207/20084; G06T 2207/20076; G06T 2207/20081; G06T 2207/20021

See application file for complete search history.

(56) References Cited

U.S. PATENT DOCUMENTS

| | | | | |
|---|---|---|---|---|
| 2010/0328504 A1* | 12/2010 | Nikula | .................. H04N 5/355 | 348/273 |
| 2010/0329566 A1* | 12/2010 | Nikula | .................. H04N 5/335 | 382/190 |
| 2011/0149274 A1* | 6/2011 | Rissa | .................. H04N 5/3745 | 356/222 |
| 2011/0176019 A1* | 7/2011 | Yang | ................. H04N 5/23229 | 348/222.1 |

(Continued)

OTHER PUBLICATIONS

Yang, F., "Bits from Photons: Oversampled Binary Image Acquisition", 132 pages, Thesis 5330, Ecole Polytechnique Federale de Lausanne, Mar. 21, 2012.

(Continued)

*Primary Examiner* — Jason A Flohre

(74) *Attorney, Agent, or Firm* — Kliger & Associates

(57) ABSTRACT

A method for image reconstruction includes defining a dictionary including a set of atoms selected such that patches of natural images can be represented as linear combinations of the atoms. A binary input image, including a single bit of input image data per input pixel, is captured using an image sensor. A maximum-likelihood (ML) estimator is applied, subject to a sparse synthesis prior derived from the dictionary, to the input image data so as to reconstruct an output image comprising multiple bits per output pixel of output image data.

20 Claims, 2 Drawing Sheets

(56) References Cited

U.S. PATENT DOCUMENTS

| | | | | |
|---|---|---|---|---|
| 2012/0307121 | A1* | 12/2012 | Lu | H04N 5/335 348/302 |
| 2013/0300912 | A1* | 11/2013 | Tosic | G06N 5/04 348/335 |
| 2014/0054446 | A1 | 2/2014 | Aleksic | |
| 2014/0072209 | A1* | 3/2014 | Brumby | G06K 9/6221 382/160 |
| 2014/0176540 | A1* | 6/2014 | Tosic | G06T 17/00 345/420 |
| 2015/0287223 | A1* | 10/2015 | Bresler | G06T 11/006 382/131 |
| 2016/0012334 | A1* | 1/2016 | Ning | G06N 99/005 706/46 |
| 2016/0048950 | A1* | 2/2016 | Baron | G06T 5/002 382/275 |
| 2016/0232690 | A1* | 8/2016 | Ahmad | G01R 33/48 |
| 2016/0335224 | A1* | 11/2016 | Wohlberg | G06T 5/001 |
| 2018/0130180 | A1* | 5/2018 | Wang | G06T 3/4046 |

OTHER PUBLICATIONS

Vogelsang et al., "High-Dynamic-Range Binary Pixel Processing Using Non-Destructive Reads and Variable Oversampling and Thresholds", Sensors Conference, 4 pages, Oct. 28-31, 2012.

Aharon et al., "K-SVD: An algorithm for designing overcomplete dictionaries for sparse representation", IEEE Transactions on Signal Processing, vol. 54, No. 11, pp. 4311-4322, Nov. 2006.

Beck et al., "A fast iterative shrinkage thresholding algorithm for linear inverse problems," SIAM Journal on Imaging Sciences, Society for Industrial and Applied Mathematics, vol. 2, No. 1, pp. 183-202, 2009.

* cited by examiner

RECONSTRUCTION OF HIGH-QUALITY IMAGES FROM A BINARY SENSOR ARRAY

CROSS-REFERENCE TO RELATED APPLICATION

This application claims the benefit of U.S. Provisional Patent Application 62/308,898, filed Mar. 16, 2016, which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to electronic imaging, and particularly to reconstruction of high-quality images from large volumes of low-quality image data.

BACKGROUND

A number of authors have proposed image sensors with dense arrays of one-bit sensor elements (also referred to as "jots" or binary pixels). The pitch of the sensor elements in the array can be less than the optical diffraction limit. Such binary sensor arrays can be considered a digital emulation of silver halide photographic film. This idea has been recently implemented, for example, in the "Gigavision" camera developed at the Ecole Polytechnique Fédérale de Lausanne (Switzerland).

As another example, U.S. Patent Application Publication 2014/0054446, whose disclosure is incorporated herein by reference, describes an integrated-circuit image sensor that includes an array of pixel regions composed of binary pixel circuits. Each binary pixel circuit includes a binary amplifier having an input and an output. The binary amplifier generates a binary signal at the output in response to whether an input voltage at the input exceeds a switching threshold voltage level of the binary amplifier.

SUMMARY

Embodiments of the present invention that are described hereinbelow provide improved methods, apparatus and software for image reconstruction from low-quality input.

There is therefore provided, in accordance with an embodiment of the invention, a method for image reconstruction, which includes defining a dictionary including a set of atoms selected such that patches of natural images can be represented as linear combinations of the atoms. A binary input image, including a single bit of input image data per input pixel, is captured using an image sensor. A maximum-likelihood (ML) estimator is applied, subject to a sparse synthesis prior derived from the dictionary, to the input image data so as to reconstruct an output image including multiple bits per output pixel of output image data.

In a disclosed embodiment, capturing the binary input image includes forming an optical image on the image sensor using objective optics with a given diffraction limit, while the image sensor includes an array of sensor elements with a pitch finer than the diffraction limit. Additionally or alternatively, capturing the binary input image includes comparing the accumulated charge in each input pixel to a predetermined threshold, wherein the accumulated charge in each input pixel in any given time frame follows a Poisson probability distribution.

Typically, defining the dictionary includes training the dictionary over a collection of natural image patches so as to find the set of the atoms that best represents the image patches subject to a sparsity constraint.

In a disclosed embodiment, applying the ML estimator includes applying the ML estimator, subject to the sparse synthesis prior, to each of a plurality of overlapping patches of the binary input image so as to generate corresponding output image patches, and pooling the output image patches to generate the output image.

In some embodiments, applying the ML estimator includes applying an iterative shrinkage-thresholding algorithm (ISTA), subject to the sparse synthesis prior, to the input image data. In one embodiment, applying the ISTA includes training a feed-forward neural network to perform an approximation of the ISTA, and applying the ML estimator includes generating the output image data using the neural network.

Additionally or alternatively, applying the ML estimator includes training a feed-forward neural network to perform an approximation of an iterative ML solution, subject to the sparse synthesis prior, and applying the ML estimator includes inputting the input image data to the neural network and receiving the output image data from the neural network. In a disclosed embodiment, the neural network includes a sequence of layers, wherein each layer corresponds to an iteration of the iterative ML solution. Additionally or alternatively, training the feed-forward neural network includes initializing parameters of the neural network based on the iterative ML solution, and then refining the neural network in an iterative adaptation process using the library.

There is also provided, in accordance with an embodiment of the invention, apparatus for image reconstruction, including a memory, which is configured to store a dictionary including a set of atoms selected such that patches of natural images can be represented as linear combinations of the atoms. A processor is configured to receive a binary input image, including a single bit of input image data per pixel, captured by an image sensor, and to apply a maximum-likelihood (ML) estimator, subject to a sparse synthesis prior derived from the dictionary, to the input image data so as to reconstruct an output image including multiple bits per pixel of output image data.

There is additionally provided, in accordance with an embodiment of the invention, a computer software product, including a computer-readable medium in which program instructions are stored, which instructions, when read by a computer, cause the computer to access a dictionary including a set of atoms selected such that patches of natural images can be represented as linear combinations of the atoms, to receive a binary input image, including a single bit of input image data per pixel, captured by an image sensor, and to apply a maximum-likelihood (ML) estimator, subject to a sparse synthesis prior derived from the dictionary, to the input image data so as to reconstruct an output image including multiple bits per pixel of output image data.

There is further provided, in accordance with an embodiment of the invention, apparatus for image reconstruction, including an interface and a processor, which is configured to access, via the interface, a dictionary including a set of atoms selected such that patches of natural images can be represented as linear combinations of the atoms, to receive a binary input image, including a single bit of input image data per pixel, captured by an image sensor, and to apply a maximum-likelihood (ML) estimator, subject to a sparse synthesis prior derived from the dictionary, to the input image data so as to reconstruct an output image including multiple bits per pixel of output image data.

The present invention will be more fully understood from the following detailed description of the embodiments thereof, taken together with the drawings in which:

DETAILED DESCRIPTION OF EMBODIMENTS

Figure 1:
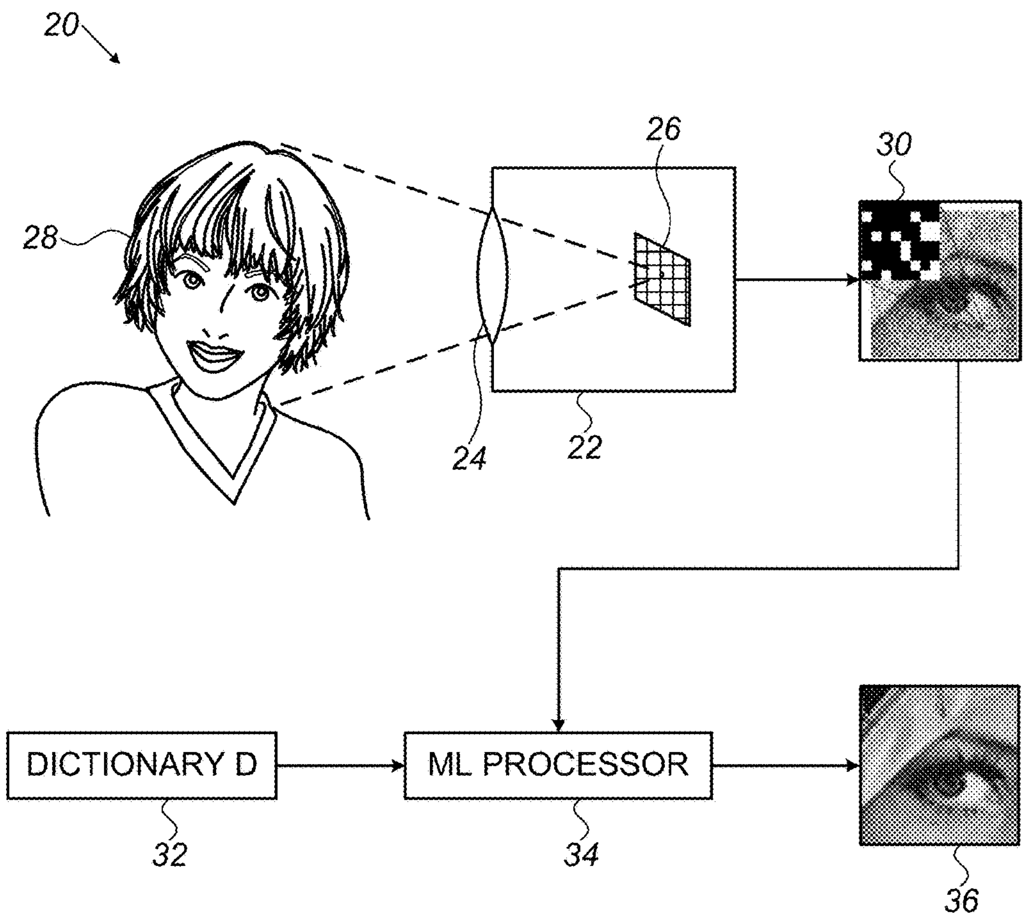
FIG. 1 is a block diagram that schematically illustrates a system for image capture and reconstruction, in accordance with an embodiment of the invention.

Dense, binary sensor arrays can, in principle, mimic the high resolution and high dynamic range of photographic films. A major bottleneck in the design of electronic imaging systems based on such sensors is the image reconstruction process, which is aimed at producing an output image with high dynamic range from the spatially-oversampled binary measurements provided by the sensor elements. Each sensor element receives a very low photon count, which is physically governed by Poisson statistics. The extreme quantization of the Poisson statistics is incompatible with the assumptions of most standard image processing and enhancement frameworks. An image processing approach based on maximum-likelihood (ML) approximation of pixel intensity values can, in principle, overcome this difficulty, but conventional ML approaches to image reconstruction from binary input pixels still suffer from image artifacts and high computational complexity.

Embodiments of the present invention that are described herein provide novel techniques that resolve the shortcomings of the ML approach and can thus reconstruct high-quality output images (with multiple bits per output pixel) from binary input image data (comprising a single bit per input pixel) with reduced computational effort. The disclosed embodiments apply a reconstruction algorithm to binary input images using an inverse operator that combines an ML data fitting term with a synthesis term based on a sparse prior probability distribution, commonly referred to simply as a "sparse prior." The sparse prior is derived from a dictionary, which is trained in advance, for example using a collection of natural image patches. The reconstruction computation is typically applied to overlapping patches in the input binary image, and the patch-by-patch results are then pooled together to generate the reconstructed output image.

In some embodiments, the image reconstruction is performed by applying an iterative shrinkage-thresholding algorithm (ISTA) (possibly of the fast iterative shrinkage-thresholding algorithm (FISTA) type) in order to carry out the ML estimation. Additionally or alternatively, a neural network can be trained to perform an approximation of the ISTA (or FISTA) fitting process, with a small, predetermined number of iterations, or even only a single iteration, and thus to implement an efficient, hardware-friendly, real-time approximation of the inverse operator. The neural network can output results patch-by-patch, or it can be trained to carry out the pooling stage of the reconstruction process, as well.

The methods and apparatus for image reconstruction that are described herein can be useful, inter alia, in producing low-cost consumer cameras based on high-density sensors that output low-quality image data. As another example, embodiments of the present invention may be applied in medical imaging systems, as well as in other applications in which image input is governed by highly-quantized Poisson statistics, particularly when reconstruction throughput is an issue.

FIG. 1 is a block diagram that schematically illustrates a system 20 for image capture and reconstruction, in accordance with an embodiment of the invention. A camera 22 comprises objective optics 24, which form an optical image of an object 28 on a binary image sensor 26. Image sensor 26 comprises an array of sensor elements, each of which outputs a '1' or a '0' depending upon whether the charge accumulated in the sensor element within a given period (for example, one image frame) is above or below a certain threshold level, which may be fixed or may vary among the sensor elements. Image sensor 26 may comprise one of the sensor types described above in the Background section, for example, or any other suitable sort of sensor array that is known in the art.

Image sensor 26 outputs a binary raw image 30, which is characterized by low dynamic range (one bit per pixel) and high spatial density, with a pixel pitch that is finer than the diffraction limit of optics 24. An ML processor 34 processes image 30, using a sparse prior that is stored in a memory 32, in order to generate an output image 36 with high dynamic range and low noise. Typically, the sparse prior is based on a dictionary D stored in the memory, as explained further hereinbelow.

To model the operation of system 20, we denote by the matrix x the radiant exposure at the aperture of camera 22 measured over a given time interval. This exposure is subsequently degraded by the optical point spread function of optics 24, denoted by the operator H, producing the radiant exposure on image sensor 26: $\lambda=Hx$. The number of photoelectrons $e_{jk}$ generated at input pixel j in time frame k follows the Poisson probability distribution with the rate $\lambda_j$, given by:

$$P(e_{jk}=n\mid\lambda_j)=\frac{e^{-\lambda_j}\lambda_j^n}{n!} \tag{1}$$

The binary sensor elements of image sensor 26 compare the accumulated charge against a threshold $q_i$ and output a one-bit measurement $b_{jk}$. Thus, the probability of a given binary pixel j to assume an "off" value in frame k is:

$$p_j=P(b_{jk}=0|q_j,\lambda_j)=P(e_{jk}<q_j|q_j,\lambda_j); \tag{2}$$

This equation can be written as:

$$P(b_{jk}|q_j,\lambda_j)=(1-b_{jk})p_j+b_{jk}(1-p_j). \tag{3}$$

Assuming independent measurements, the negative log likelihood of the radiant exposure x, given the measurements $b_{jk}$ in a binary image B, can be expressed as:

$$\ell(x \mid B) = const - \sum_{j,k} \log P(b_{jk} \mid q_j, \lambda_j). \tag{4}$$

Processor 34 reconstructs output image 36 by solving equation (4), subject to the sparse spatial prior given by the dictionary D. Details of the solution process are described hereinbelow with reference to FIGS. 2 and 3.

In some embodiments, processor 34 comprises a programmable, general-purpose computer processor, which is programmed in software to carry out the functions that are described herein. Memory 32, which holds the dictionary, may be a component of the same computer, and is accessed by processor 34 in carrying out the present methods. Alternatively or additionally, processor 34 may access the dictionary via a suitable interface, such as a computer bus interface or a network interface controller, through which the processor can access the dictionary via a network. The software for carrying out the functions described herein may be downloaded to processor 34 in electronic form, over a network, for example. Additionally or alternatively, the software may be stored on tangible, non-transitory computer-readable media, such as optical, magnetic, or electronic memory media. Further additionally or alternatively, at least some of the functions of processor may be carried out by hard-wired or programmable hardware logic, such as a programmable gate array. An implementation of this latter sort is described in detail in the above-mentioned provisional patent application.

Figure 2:
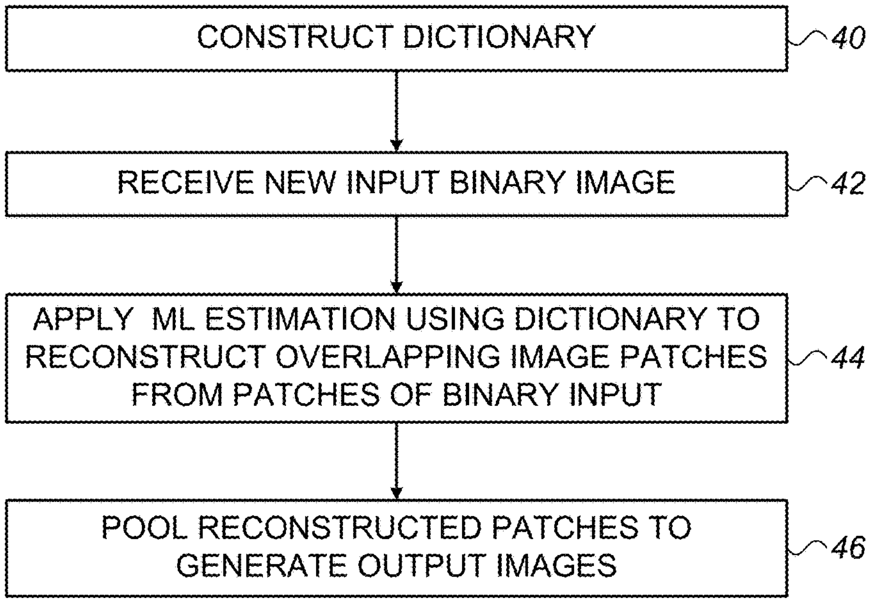
FIG. 2 is a flow chart that schematically illustrates a method for image reconstruction, in accordance with an embodiment of the invention.

FIG. 2 is a flow chart that schematically illustrates the method by which processor 34 solves equation (4), and thus reconstructs output image 36 from a given binary input image 30, in accordance with an embodiment of the invention.

As a preliminary step, processor 34 (or another computer) defines dictionary D, based on a library of known image patches, at a dictionary construction step 40. The dictionary comprises a set of atoms selected such that patches of natural images can be represented as linear combinations of the atoms. The dictionary is constructed by training over a collection of natural image patches so as to find the set of the atoms that best represents the image patches subject to a sparsity constraint.

Processor 34 may access a dictionary that has been constructed and stored in advance, or the processor may itself construct the dictionary at step 40. Techniques of singular value decomposition (SVD) that are known in the art may be used for this purpose. In particular, the inventors have obtained good results in dictionary construction using the k-SVD algorithm described by Aharon et al., in "K-SVD: An algorithm for designing overcomplete dictionaries for sparse representation," *IEEE Transactions on Signal Processing* 54(11), pages 4311-4322 (2006), which is incorporated herein by reference. Given a set of signals, such as image patches, K-SVD tries to extract the best dictionary that can sparsely represent those signals. An implementation of K-SVD that can be run for this purpose on the well-known MATLAB toolbox is listed hereinbelow in an Appendix, which is an integral part of the present patent application. K-SVD software is available for download from the Technion Computer Science Web site at the address www.cs.technion.ac.il/~elad/Various/KSVD_Matlab_ToolBox.zip.

Camera 22 captures a binary image 30 (B) and inputs the image to processor 34, at an image input step 42. Processor 34 now applies ML estimation, using a sparse prior based on the dictionary D, to reconstruct overlapping patches of output image 36 from corresponding patches of the input image, at an image reconstruction step 44. This reconstruction assumes that the radiant exposure λ can be expressed in terms of D by the kernelized sparse representation: $\lambda = H\rho(Dz)$, wherein z is a vector of coefficients, and ρ is an element-wise intensity transformation function. As one example, for image reconstruction subject to the Poisson statistics of equation (1), the inventors have found a hybrid exponential-linear function to give good results:

$$\rho(x) = \begin{cases} c\exp(x) & x \le 0 \\ c(1+x) & x > 0 \end{cases} \tag{5}$$

wherein c is a constant. Alternatively, other suitable functional representations of ρ may be used.

Processor 34 reconstructs the radiant exposure x at step 44 using the estimator $\hat{x} = \rho(D\hat{z})$, wherein:

$$\hat{z} = \underset{z}{\operatorname{argmin}}\, \ell(\rho(Dz) \mid B) + \mu \|z\|_1, \tag{6}$$

The first term on the right-hand side of this equation is the negative log-likelihood fitting term for ML estimation, while $\|z\|_1$ denotes the $l_1$ norm of the coefficient vector z, which drives the ML solution toward the sparse synthesis prior. The fitting parameter μ can be set to any suitable value, for example μ=4.

In some embodiments, processor 34 solves equation (6) using an iterative optimization algorithm, such as an iterative shrinkage thresholding algorithm (ISTA), or particularly its accelerated version, FISTA, as described by Beck and Teboulle in "A fast iterative shrinkage thresholding algorithm for linear inverse problems," *SIAM Journal on Imaging Sciences* 2(1), pages 183-202 (2009), which is incorporated herein by reference. This algorithm is presented below in Listing I, in which $\sigma_\theta$ is the coordinate-wise shrinking function, with threshold θ and step size η, and the gradient of the negative log-likelihood computed at each iteration is given by:

$$\frac{\partial \ell}{\partial z} = D^T \operatorname{diag}(\rho'(Dz)) H^T \nabla \ell(H\rho(Dz) \mid B). \tag{7}$$

LISTING I

Input: Binary measurements B, step size η
Output: Reconstructed image $\hat{x}$
initialize $z^* = z = 0$, $\beta < 1$, $m_0 = 1$
for t = 1, 2, . . . , until convergence do
  //Backtracking
  while $l(z^*) \ge l(z) + \left\langle z^* - z, \frac{\partial l}{\partial z} \right\rangle + \frac{1}{2\eta}\|z^* - z\|_2^2$ do
    $\eta = \eta\beta$
    $z^* = \sigma_{\mu\eta}\left(z - \eta \frac{\partial l}{\partial z}\right)$
  end
  //Step
  $m_{t+1} = \frac{1 + \sqrt{1 + 4m_t^2}}{2}$ -continued

LISTING I $$|\quad z = z^* + \frac{m_t - 1}{m_{t+1}}(z^* - z)$$

end $\hat{x} = \rho(Dz)$

Using the techniques described above, processor 34 solves equation (6) for each patch of the input binary image B and thus recovers the estimated intensity distribution $\hat{x}$ of the patch at step 44. Processor 34 pools these patches to generate output image 36, at a pooling step 46. For example, overlapping patches may be averaged together in order to give a smooth output image.

Although the iterative method of solution that is presented above is capable of reconstructing output images with high fidelity (with a substantially higher ratio of peak signal to noise, PSNR, and better image quality than ML estimation alone), the solution can require hundreds of iterations to converge. Furthermore, the number of iterations required to converge to an output image of sufficient quality can vary from image to image. This sort of performance is inadequate for real-time applications, in which fixed computation time is generally required. To overcome this limitation, in an alternative embodiment of the present invention, a small number T of ISTA iterations are unrolled into a feedforward neural network, which subsequently undergoes supervised training on typical inputs for a given cost function f.

Figure 3:
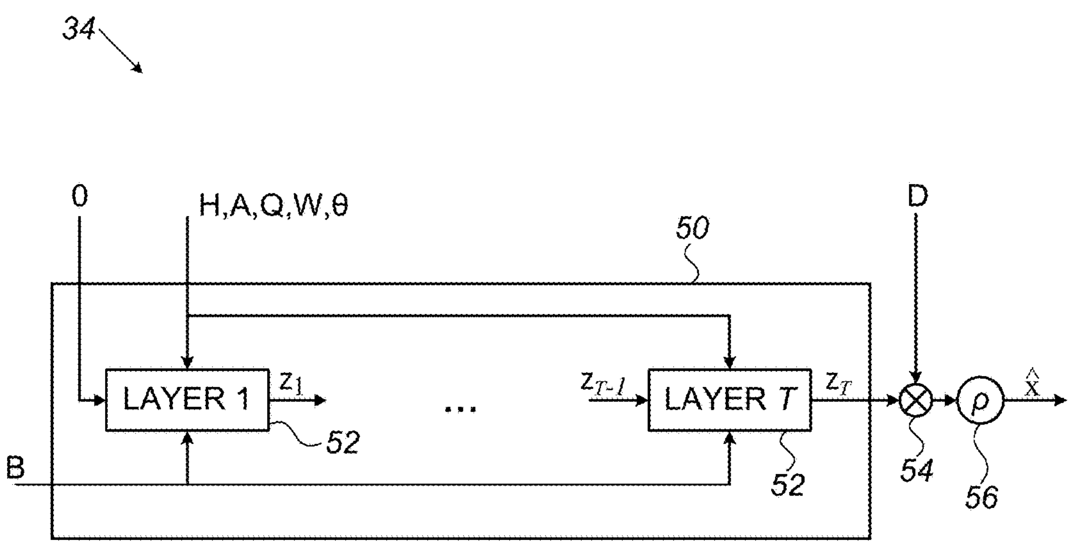
FIG. 3 is a block diagram that schematically shows details of the operation of image processing apparatus, in accordance with an embodiment of the invention.

FIG. 3 is a block diagram that schematically shows details of an implementation of processor 34 based on such a feedforward neural network 50, in accordance with an embodiment of the invention. Network 50 comprises a sequence of T layers 52, each corresponding to a single ISTA iteration. For the present purposes, such an iteration can be written in the form:

$$z_{t+1} = \sigma_\theta(z_t - W\mathrm{diag}(\rho'(Qz_t))H^T\nabla l(H\rho(Az_t)|B)) \tag{8}$$

wherein A=Q=D, $W = \eta D^T$, and $\theta = \mu\eta 1$. Each layer 52 corresponds to one such iteration, parameterized by A, Q, W, and θ, accepting $z_t$ as input and producing $z_{t+1}$ as output.

The output of the final layer gives the coefficient vector $\hat{z} = z_T$, which is then multiplied by the dictionary matrix D, in a multiplier 54, and converted to the radiant intensity $\hat{x} = \rho(D\hat{z})$ by a transformation operator 56.

Layers 52 of neural network 50 are trained by initializing the network parameters as prescribed by equation (8) and then refining the network in an iterative adaptation process, using a training set of N known image patches and their corresponding binary images. The adaptation process can use a stochastic gradient approach, which is set to minimize the reconstruction error F of the entire network, as given by:

$$\mathcal{F} = \frac{1}{N}\sum_{n=1}^{N} f(x_n^*, \hat{z}_T(B_n), D) \tag{9}$$

Here $x_n^*$ are the ground truth image patches, and $\hat{z}_T(B_n)$ denotes the output of network 50 with T layers 52, given the binary images $B_n$ corresponding to $x_n^*$ as input. For a large enough training set, F approximates the expected value of the cost function f corresponding to the standard squared error:

$$f = \tfrac{1}{2}\|x_n^* - \rho(Dz_T(B_n))\|_2^2. \tag{10}$$

The output of network 50 and the derivative of the loss F with respect to the network parameters are calculated using forward and back propagation, as summarized in Listings II and III below, respectively. In Listing III, the gradient of the scalar loss F with respect to each network parameter * is denoted by δ*. The gradient with respect to D, δD, is calculated separately, as it depends only on the last iteration of the network.

LISTING II

Input: Number of layers T,θ,Q,D,W,A

Output: Reconstructed image $\hat{x}$,
auxiliary variables $\{z_t\}_{t=0}^T, \{b_t\}_{t=1}^T$ initialize $z_0 = 0$ for t = 1,2,...,T do $|\quad b_t = z_{t-1} - W\mathrm{diag}(\rho'(Qz_{t-1}))H^T\nabla l(H\rho(Az_{t-1}))$ $|\quad z_t = \sigma_\theta(b_t)$ end $\hat{x} = \rho(Dz_T)$

LISTING III

Input: Loss $\mathcal{F}$, outputs of 2: $\{z_t\}_{t=0}^T$, $\{b_t\}_{t=1}^T$

Output: Gradients of the loss w.r.t. network parameters δW, δA, δQ, δθ initialize $\delta W^T = \delta A = \delta Q = 0,\ \delta\theta = 0,\ \delta z_T = \frac{d\mathcal{F}}{dz_T}$ for t = T, T − 1, . . . , 1 do $|\quad a^{(1)} = Az_{t-1}$ $|\quad a^{(2)} = Qz_{t-1}$ $|\quad a^{(3)} = Az_t$ $|\quad a^{(4)} = Qz_t$ $|\quad a^{(5)} = H\mathrm{diag}(\rho'(a^{(2)}))$ $|\quad \delta b = \delta z_t \mathrm{diag}(\sigma'_\theta(b_t))$ $|\quad \delta W = \delta W - \delta b\nabla l(H\rho(a^{(1)}))^T a^{(5)}$ $|\quad \delta A = \delta A - \mathrm{diag}(\rho'(a^{(1)}))H^T\nabla^2 l(H\rho(a^{(1)}))^T a^{(5)}W^T\delta b_t z_{t-1}^T$ $|\quad \delta Q = \delta Q - \mathrm{diag}(H^T\nabla l(H\rho(a^{(1)})))\mathrm{diag}(\rho''(a^{(2)}))W^T\delta b z_{t-1}^T$ $|\quad \delta\theta = \delta\theta - \delta z\frac{\partial\sigma_\theta(b_t)}{\partial\theta}$ $|\quad F = W\mathrm{diag}(\rho'(a^{(4)}))H^T\nabla^2 l(H\rho(a^{(3)})H\mathrm{diag}(\rho'(a^{(3)})A))$ $|\quad G = \nabla l(H\rho(a^{(3)})^T H\mathrm{diag}(\rho''(a^{(4)}))\mathrm{diag}(W^T\delta b^T)Q$ $|\quad \delta z_{t-1} = \delta b^T(I - F) - G$ end The inventors found that the above training process makes it possible to reduce the number of iterations required to reconstruct $\hat{x}$ by about two orders of magnitude while still achieving a reconstruction quality comparable to that of ISTA or FISTA. For example, in one experiment, the inventors found that network 50 with only four trained layers 52 was able to reconstruct images with PSNR in excess of 27 dB, while FISTA required about 200 iterations to achieve the same reconstructed image quality. This and other experiments are described in the above-mentioned provisional patent application.

Although the systems and techniques described herein focus specifically on processing of binary images, the principles of the present invention may be applied, mutatis mutandis, to other sorts of low-quality image data, such as input images comprising two or three bits per input pixel, as well as image denoising and low-light imaging, image reconstruction from compressed samples, reconstruction of sharp images over an extended depth of field (EDOF), inpainting, resolution enhancement (super-resolution), and reconstruction of image sequences using discrete event data. Techniques for processing these sorts of low-quality image data are described in the above-mentioned U.S. Provisional Patent Application 62/308,898 and are considered to be within the scope of the present invention.

The work leading to this invention has received funding from the European Research Council under the European Union's Seventh Framework Programme (FP7/2007-2013)/ERC grant agreement no. 335491.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX - K-SVD LISTING

```
function [Dictionary,output] = KSVD(...
    Data,... % an nXN matrix that contains N signals (Y), each of
dimension n.
    param)
%
=========================================================================
%                           K SVD algorithm
%
=========================================================================
% The K-SVD algorithm finds a dictionary for linear representation of
% signals. Given a set of signals, it searches for the best dictionary
that
% can sparsely represent each signal. Detailed discussion on the
algorithm
% and possible applications can be found in "The K-SVD: An Algorithm for
% Designing of Overcomplete Dictionaries for Sparse Representation",
written
% by M. Aharon, M. Elad, and A.M. Bruckstein and appeared in the IEEE
Trans.
```

```
% On Signal Processing, Vol. 54, no. 11, pp. 4311-4322, November 2006.
%
==========================================================================
% INPUT ARGUMENTS:
% Data                          an nXN matrix that contains N signals (Y),
each of dimension n.
% param                         structure that includes all required
%                                  parameters for the K-SVD execution.
%                                  Required fields are:
%    K, ...                     the number of dictionary elements to train
%    numIteration,...           number of iterations to perform.
%    errorFlag...               if =0, a fix number of coefficients is
%                                  used for representation of each signal.
If so, param.L must be
%                                  specified as the number of representing
atom. if =1, arbitrary number
%                                  of atoms represent each signal, until a
specific representation error
%                                  is reached. If so, param.errorGoal must
be specified as the allowed
%                                  error.
%    preserveDCAtom...          if =1 then the first atom in the
dictionary
%                                  is set to be constant, and does not
ever change. This
%                                  might be useful for working with
natural
%                                  images (in this case, only param.K-1
%                                  atoms are trained).
%    (optional, see errorFlag) L,...                 % maximum
coefficients to use in OMP coefficient calculations.
%    (optional, see errorFlag) errorGoal, ...        % allowed
representation error in representing each signal.
```

```
%    InitializationMethod,...  mehtod to initialize the dictionary, can
%                                 be one of the following arguments:
%                                 * 'DataElements' (initialization by the
signals themselves), or:
%                                 * 'GivenMatrix' (initialization by a
given matrix param.initialDictionary).
%    (optional, see InitializationMethod) initialDictionary,...      % if
the initialization method
%                                 is 'GivenMatrix', this is the matrix
that will be used.
%    (optional) TrueDictionary, ...        % if specified, in each
%                                 iteration the difference between this
dictionary and the trained one
%                                 is measured and displayed.
%    displayProgress, ...      if =1 progress information is displyed. If
param.errorFlag==0,
%                                 the average repersentation error (RMSE)
is displayed, while if
%                                 param.errorFlag==1, the average number
of required coefficients for
%                                 representation of each signal is
displayed.
%
=========================================================================
% OUTPUT ARGUMENTS:
%  Dictionary                  The extracted dictionary of size
nX(param.K).
%  output                      Struct that contains information about the
current run. It may include the following fields:
%    CoefMatrix                  The final coefficients matrix (it should
hold that Data equals approximately Dictionary*output.CoefMatrix.
%    ratio                       If the true dictionary was defined (in
```

```
%                                 synthetic experiments), this parameter
holds a vector of length
%                                 param.numIteration that includes the
detection ratios in each
%                                 iteration).
%    totalerr                     The total representation error after
each
%                                 iteration (defined only if
%                                 param.displayProgress=1 and
%                                 param.errorFlag = 0)
%    numCoef                      A vector of length param.numIteration
that
%                                 include the average number of
coefficients required for representation
%                                 of each signal (in each iteration)
(defined only if
%                                 param.displayProgress=1 and
%                                 param.errorFlag = 1)
%
=========================================================================

if (~isfield(param,'displayProgress'))
    param.displayProgress = 0;
end
totalerr(1) = 99999;
if (isfield(param,'errorFlag')==0)
    param.errorFlag = 0;
end

if (isfield(param,'TrueDictionary'))
    displayErrorWithTrueDictionary = 1;
    ErrorBetweenDictionaries = zeros(param.numIteration+1,1);
    ratio = zeros(param.numIteration+1,1);
```

```
else
    displayErrorWithTrueDictionary = 0;
     ratio = 0;
end
if (param.preserveDCAtom>0)
    FixedDictionaryElement(1:size(Data,1),1) = 1/sqrt(size(Data,1));
else
    FixedDictionaryElement = [];
end
% coefficient calculation method is OMP with fixed number of coefficients

if (size(Data,2) < param.K)
    disp('Size of data is smaller than the dictionary size. Trivial
solution...');
    Dictionary = Data(:,1:size(Data,2));
    return;
elseif (strcmp(param.InitializationMethod,'DataElements'))
    Dictionary(:,1:param.K-param.preserveDCAtom) = Data(:,1:param.K-
param.preserveDCAtom);
elseif (strcmp(param.InitializationMethod,'GivenMatrix'))
    Dictionary(:,1:param.K-param.preserveDCAtom) =
param.initialDictionary(:,1:param.K-param.preserveDCAtom);
end
% reduce the components in Dictionary that are spanned by the fixed
% elements
if (param.preserveDCAtom)
    tmpMat = FixedDictionaryElement \ Dictionary;
    Dictionary = Dictionary - FixedDictionaryElement*tmpMat;
end
%normalize the dictionary.
Dictionary = Dictionary*diag(1./sqrt(sum(Dictionary.*Dictionary)));
```

```
Dictionary =
Dictionary.*repmat(sign(Dictionary(1,:)),size(Dictionary,1),1); %
multiply in the sign of the first element.
totalErr = zeros(1,param.numIteration);

% the K-SVD algorithm starts here.

for iterNum = 1:param.numIteration
    % find the coefficients
    if (param.errorFlag==0)
        %CoefMatrix = mexOMPIterative2(Data,
[FixedDictionaryElement,Dictionary],param.L);
        CoefMatrix = OMP([FixedDictionaryElement,Dictionary],Data,
param.L);
    else
        %CoefMatrix = mexOMPerrIterative(Data,
[FixedDictionaryElement,Dictionary],param.errorGoal);
        CoefMatrix = OMPerr([FixedDictionaryElement,Dictionary],Data,
param.errorGoal);
        param.L = 1;
    end

    replacedVectorCounter = 0;
      rPerm = randperm(size(Dictionary,2));
    for j = rPerm
        [betterDictionaryElement,CoefMatrix,addedNewVector] =
I_findBetterDictionaryElement(Data,...

[FixedDictionaryElement,Dictionary],j+size(FixedDictionaryElement,2),...
            CoefMatrix ,param.L);
        Dictionary(:,j) = betterDictionaryElement;
        if (param.preserveDCAtom)
            tmpCoef = FixedDictionaryElement\betterDictionaryElement;
```

```
            Dictionary(:,j) = betterDictionaryElement -
FixedDictionaryElement*tmpCoef;
            Dictionary(:,j) =
Dictionary(:,j)./sqrt(Dictionary(:,j)'*Dictionary(:,j));
        end
        replacedVectorCounter = replacedVectorCounter+addedNewVector;
    end

    if (iterNum>1 & param.displayProgress)
        if (param.errorFlag==0)
            output.totalerr(iterNum 1) = sqrt(sum(sum((Data
[FixedDictionaryElement,Dictionary]*CoefMatrix).^2))/prod(size(Data)));
            disp(['Iteration   ',num2str(iterNum),'   Total error is:
',num2str(output.totalerr(iterNum-1))]);
        else
            output.numCoef(iterNum-1) =
length(find(CoefMatrix))/size(Data,2);
            disp(['Iteration   ',num2str(iterNum),'   Average number of
coefficients: ',num2str(output.numCoef(iterNum-1))]);
        end
    end
    if (displayErrorWithTrueDictionary )
        [ratio(iterNum+1),ErrorBetweenDictionaries(iterNum+1)] =
I_findDistanseBetweenDictionaries(param.TrueDictionary,Dictionary);
        disp(strcat(['Iteration  ', num2str(iterNum),' ratio of restored
elements: ',num2str(ratio(iterNum+1))]));
        output.ratio = ratio;
    end
    Dictionary =
I_clearDictionary(Dictionary,CoefMatrix(size(FixedDictionaryElement,2)+1:
end,:),Data);

    if (isfield(param,'waitBarHandle'))
```

```
        waitbar(iterNum/param.counterForWaitBar);
    end
end

output.CoefMatrix = CoefMatrix;
Dictionary = [FixedDictionaryElement,Dictionary];
%%%%%%%%%%%%%%%%%%%%%%%%%%%%%%%%%%%%%%%%
%  findBetterDictionaryElement
%%%%%%%%%%%%%%%%%%%%%%%%%%%%%%%%%%%%%%%%

function [betterDictionaryElement,CoefMatrix,NewVectorAdded] =
I_findBetterDictionaryElement(Data,Dictionary,j,CoefMatrix,numCoefUsed)
if (length(who('numCoefUsed'))==0)
    numCoefUsed = 1;
end
relevantDataIndices = find(CoefMatrix(j,:)); % the data indices that uses
the j'th dictionary element.
if (length(relevantDataIndices)<1) %(length(relevantDataIndices)==0)
    ErrorMat = Data-Dictionary*CoefMatrix;
    ErrorNormVec = sum(ErrorMat.^2);
    [d,i] = max(ErrorNormVec);
    betterDictionaryElement = Data(:,i);%ErrorMat(:,i); %
    betterDictionaryElement =
betterDictionaryElement./sqrt(betterDictionaryElement'*betterDictionaryEl
ement);
    betterDictionaryElement =
betterDictionaryElement.*sign(betterDictionaryElement(1));
    CoefMatrix(j,:) = 0;
    NewVectorAdded = 1;
    return;
end

NewVectorAdded = 0;
```

```
tmpCoefMatrix = CoefMatrix(:,relevantDataIndices);
tmpCoefMatrix(j,:) = 0;% the coeffitients of the element we now improve
are not relevant.
errors =(Data(:,relevantDataIndices)   Dictionary*tmpCoefMatrix); %
vector of errors that we want to minimize with the new element
% % the better dictionary element and the values of beta are found using
svd.
% % This is because we would like to minimize || errors - beta*element
||_F^2.
% % that is, to approximate the matrix 'errors' with a one-rank matrix.
This
% % is done using the largest singular value.
[betterDictionaryElement,singularValue,betaVector] = svds(errors,1);
CoefMatrix(j,relevantDataIndices) = singularValue*betaVector';%
*signOfFirstElem

%%%%%%%%%%%%%%%%%%%%%%%%%%%%%%%%%%%%%%%%
%  findDistanseBetweenDictionaries
%%%%%%%%%%%%%%%%%%%%%%%%%%%%%%%%%%%%%%%%
function [ratio,totalDistances] =
I_findDistanseBetweenDictionaries(original,new)
% first, all the column in oiginal starts with positive values.
catchCounter = 0;
totalDistances = 0;
for i = 1:size(new,2)
    new(:,i) = sign(new(1,i))*new(:,i);
end
for i = 1:size(original,2)
    d = sign(original(1,i))*original(:,i);
    distances =sum ( (new repmat(d,1,size(new,2))).^2);
    [minValue,index] = min(distances);
    errorOfElement = 1-abs(new(:,index)'*d);
    totalDistances = totalDistances+errorOfElement;
```

```
    catchCounter = catchCounter+(errorOfElement<0.01);
end
ratio = 100*catchCounter/size(original,2);

%%%%%%%%%%%%%%%%%%%%%%%%%%%%%%%%%%%%%%%%
%  I_clearDictionary
%%%%%%%%%%%%%%%%%%%%%%%%%%%%%%%%%%%%%%%%
function Dictionary = I_clearDictionary(Dictionary,CoefMatrix,Data)
T2 = 0.99;
T1 = 3;
K=size(Dictionary,2);
Er=sum((Data-Dictionary*CoefMatrix).^2,1); % remove identical atoms
G=Dictionary'*Dictionary; G = G-diag(diag(G));
for jj=1:1:K,
    if max(G(jj,:))>T2 | length(find(abs(CoefMatrix(jj,:))>1e 7))<=T1 ,
        [val,pos]=max(Er);
        Er(pos(1))=0;
        Dictionary(:,jj)=Data(:,pos(1))/norm(Data(:,pos(1)));
        G=Dictionary'*Dictionary; G = G-diag(diag(G));
    end;
end;
```

The invention claimed is:

1. A method for image reconstruction, comprising:

defining a dictionary comprising a set of atoms selected such that patches of natural images can be represented as linear combinations of the atoms;

capturing a binary input image, comprising a single bit of input image data per input pixel, using an image sensor; and applying a maximum-likelihood (ML) estimator, subject to a sparse synthesis prior derived from the dictionary, to the input image data so as to reconstruct an output image comprising multiple bits per output pixel of output image data, wherein applying the ML estimator comprises training a feed-forward neural network to perform an approximation of an iterative ML solution, subject to the sparse synthesis prior, and wherein applying the ML estimator comprises inputting the input image data to the neural network and receiving the output image data from the neural network.

2. The method according to claim 1, wherein capturing the binary input image comprises forming an optical image on the image sensor using objective optics with a given diffraction limit, while the image sensor comprises an array of sensor elements with a pitch finer than the diffraction limit.

3. The method according to claim 1, wherein capturing the binary input image comprises comparing the accumulated charge in each input pixel to a predetermined threshold, wherein the accumulated charge in each input pixel in any given time frame follows a Poisson probability distribution.

4. The method according to claim 1, wherein defining the dictionary comprises training the dictionary over a collection of natural image patches so as to find the set of the atoms that best represents the image patches subject to a sparsity constraint.

5. The method according to claim 1, wherein applying the ML estimator comprises applying the ML estimator, subject to the sparse synthesis prior, to each of a plurality of overlapping patches of the binary input image so as to generate corresponding output image patches, and pooling the output image patches to generate the output image.

6. The method according to claim 1, wherein applying the ML estimator comprises applying an iterative shrinkage-thresholding algorithm (ISTA), subject to the sparse synthesis prior, to the input image data.

7. A method for image reconstruction, comprising:

defining a dictionary comprising a set of atoms selected such that patches of natural images can be represented as linear combinations of the atoms;

capturing a binary input image, comprising a single bit of input image data per input pixel, using an image sensor; and applying a maximum-likelihood (ML) estimator, subject to a sparse synthesis prior derived from the dictionary, to the input image data so as to reconstruct an output image comprising multiple bits per output pixel of output image data, wherein applying the ML estimator comprises applying an iterative shrinkage-thresholding algorithm (ISTA), subject to the sparse synthesis prior, to the input image data, and wherein applying the ISTA comprises training a feed-forward neural network to perform an approximation of the ISTA, and wherein applying the ML estimator comprises generating the output image data using the neural network.

8. The method according to claim 1, wherein the neural network comprises a sequence of layers, wherein each layer corresponds to an iteration of the iterative ML solution.

9. The method according to claim 1, wherein training the feed-forward neural network comprises initializing parameters of the neural network based on the iterative ML solution, and then refining the neural network in an iterative adaptation process using the dictionary.

10. Apparatus for image reconstruction, comprising:

a memory, which is configured to store a dictionary comprising a set of atoms selected such that patches of natural images can be represented as linear combinations of the atoms; and a processor, which is configured to receive a binary input image, comprising a single bit of input image data per pixel, captured by an image sensor, and to apply a maximum-likelihood (ML) estimator, subject to a sparse synthesis prior derived from the dictionary, to the input image data so as to reconstruct an output image comprising multiple bits per pixel of output image data, wherein the processor comprises a feed-forward neural network, which is trained to perform an approximation of an iterative ML solution, subject to the sparse synthesis prior, and which is coupled to receive the input image data and to generate the output image data.

11. The apparatus according to claim 10, and comprising a camera, which comprises the image sensor and objective optics, which are configured to form an optical image on the image sensor with a given diffraction limit, while the image sensor comprises an array of sensor elements with a pitch finer than the diffraction limit.

12. The apparatus according to claim 11, wherein the image sensor is configured to generated the input image data by comparing the accumulated charge in each pixel to a predetermined threshold, wherein the accumulated charge in each pixel in any given time frame follows a Poisson probability distribution.

13. The apparatus according to claim 10, wherein the dictionary is trained over a collection of natural image patches so as to find the set of the atoms that best represents the image patches subject to a sparsity constraint.

14. The apparatus according to claim 10, wherein the processor is configured to apply the ML estimator, subject to the sparse synthesis prior, to each of a plurality of overlapping patches of the binary input image so as to generate corresponding output image patches, and to pool the output image patches to generate the output image.

15. The apparatus according to claim 10, wherein the processor is configured to perform ML estimation by applying an iterative shrinkage-thresholding algorithm (ISTA), subject to the sparse synthesis prior, to the input image data.

16. The apparatus according to claim 15, wherein the processor comprises a feed-forward neural network, which is configured to generate the output image data by performing an approximation of the ISTA.

17. The apparatus according to claim 10, wherein the neural network comprises a sequence of layers, wherein each layer corresponds to an iteration of the iterative ML solution.

18. The apparatus according to claim 10, wherein the feed-forward neural network is trained by initializing parameters of the neural network based on the iterative ML solution, and then refining the neural network in an iterative adaptation process using the dictionary.

19. A computer software product, comprising a non-transitory computer-readable medium in which program instructions are stored, which instructions, when read by a computer, cause the computer to access a dictionary comprising a set of atoms selected such that patches of natural images can be represented as linear combinations of the atoms, to receive a binary input image, comprising a single bit of input image data per pixel, captured by an image sensor, and to apply a maximum-likelihood (ML) estimator, subject to a sparse synthesis prior derived from the dictionary, to the input image data so as to reconstruct an output image comprising multiple bits per pixel of output image data, wherein the instructions cause the computer to train a feed-forward neural network to perform an approximation of an iterative ML solution, subject to the sparse synthesis prior, and to apply the ML estimator by inputting the input image data to the neural network and receiving the output image data from the neural network.

20. Apparatus for image reconstruction, comprising:

an interface; and a processor, which is configured to access, via the interface, a dictionary comprising a set of atoms selected such that patches of natural images can be represented as linear combinations of the atoms, to receive a binary input image, comprising a single bit of input image data per pixel, captured by an image sensor, and to apply a maximum-likelihood (ML) estimator, subject to a sparse synthesis prior derived from the dictionary, to the input image data so as to reconstruct an output image comprising multiple bits per pixel of output image data, wherein the processor comprises a feed-forward neural network, which is trained to perform an approximation of an iterative ML solution, subject to the sparse synthesis prior, and which is coupled to receive the input image data and to generate the output image data.

* * * * *